United States Patent
Kwon (10) Patent No.: US 7,570,938 B2
(45) Date of Patent: Aug. 4, 2009

(54) APPARATUS AND METHOD FOR TRANSMITTING/RECEIVING AN EMERGENCY RESCUE REQUEST USING UWB SIGNALS

(75) Inventor: Soon-Hwan Kwon, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 562 days.

(21) Appl. No.: 11/133,041

(22) Filed: May 19, 2005

(65) Prior Publication Data

US 2006/0046687 A1    Mar. 2, 2006

(30) Foreign Application Priority Data

Aug. 30, 2004    (KR) .................... 10-2004-0068389

(51) Int. Cl.
*H04M 11/04* (2006.01)
(52) U.S. Cl. ............... 455/404.1; 455/404.2; 455/456.1
(58) Field of Classification Search ............. 455/404.1, 455/404.2, 414.1, 456.1, 456.2, 456.3, 67.11, 455/67.16, 566, 422.1; 340/539.1, 426.18, 340/568.1; 342/387, 458, 14, 13, 195, 175
See application file for complete search history.

(56) References Cited

U.S. PATENT DOCUMENTS

| | | | |
|---|---|---|---|
| 5,982,322 A * | 11/1999 | Bickley et al. ......... | 342/357.08 |
| 7,224,955 B2 * | 5/2007 | Min ........................ | 455/404.1 |
| 2001/0036832 A1 | 11/2001 | McKay | |
| 2002/0156646 A1 * | 10/2002 | Kaiwa et al. .................... | 705/1 |
| 2003/0069025 A1 | 4/2003 | Hoctor et al. | |
| 2003/0125010 A1 * | 7/2003 | Jung ........................... | 455/404 |
| 2003/0197643 A1 | 10/2003 | Fullerton et al. | |
| 2004/0002346 A1 | 1/2004 | Santhoff | |
| 2004/0166828 A1 * | 8/2004 | Yosioka ....................... | 455/344 |
| 2004/0229564 A1 * | 11/2004 | Huang et al. ............... | 455/41.2 |
| 2005/0009536 A1 * | 1/2005 | Ito et al. ................... | 455/456.1 |
| 2005/0195883 A1 * | 9/2005 | Choi et al. ................... | 375/130 |
| 2005/0197096 A1 * | 9/2005 | Yang et al. ............... | 455/404.1 |

* cited by examiner

*Primary Examiner*—Jean A Gelin
(74) *Attorney, Agent, or Firm*—The Farrell Law Firm, LLP (57) ABSTRACT

An apparatus and a method for transmitting/receiving emergency rescue signals are disclosed. In the apparatus and the method, when an emergency occurs, it is possible to provide a function capable of notifying a place at which such an emergency has occurred by means of a corresponding terminal. Accordingly, when a rescue request is accepted, a rescue center sends a rescue team to the general position of the terminal based on the GPS position information or the reporter's statement, and finds out an exact point for a corresponding terminal by means of a searching apparatus. Herein, the rescue team receives UWB signals received from the corresponding terminal of a victim at the already understood general position through the searching apparatus, and finds the victim's exact position.

14 Claims, 10 Drawing Sheets

| VALUE (hex) | DATA TYPE |
|---|---|
| 00 | Concatenated short messages, 8-bit reference number |
| 01 | Special SMS Message Indication |
| ... | ... |
| 14-1F | Reserved for future EMS features (see clause 3.10) |
| 20 | RFC 822 E-Mail Header |
| 21-6F | Reserved for future use |
| 70-7F | (U)SIM Toolkit Security Headers |
| 80-9F | SME to SME specific use |
| A0-BF | Reserved for future use |
| C0-DF | SC specific use |
| E0-FF | Reserved for future use |

APPARATUS AND METHOD FOR TRANSMITTING/RECEIVING AN EMERGENCY RESCUE REQUEST USING UWB SIGNALS

PRIORITY

This application claims priority to an application entitled "Apparatus and Method for Transmitting/Receiving Emergency Rescue Request Using UWB Signals" filed in the Korean Intellectual Property Office on Aug. 30, 2004 and assigned Serial No. 2004-68389, the contents of which are incorporated herein by reference.

BACKGROUND OF THE INVENTION

1. Field of the Invention

The present invention relates to an apparatus and a method for transmitting/receiving emergency rescue signals, and more particularly to an emergency rescue request apparatus and method capable of quickly requesting a rescue by means of Ultra-Wideband (UWB) signals in an emergency, regardless of time and place.

2. Description of the Related Art

With the relatively recent advent of mobile communications, there has been a rise in the use of mobile communication terminals to report emergencies. However, in emergency situations, the person reporting the emergency over a mobile terminal to a rescue team, is usually confused and cannot sufficiently explain his location. This is especially true where an emergency occurs at a place that is not precisely recognized by the reporter. Therefore, the reporter may not report the emergency in enough time to help the situation.

Accordingly, a position location service using a mobile communication terminal is provided. In particular, the following methods have been developed to solve the problem where the reporter has difficulty determining his position and thus, location.

A position location service using a mobile communication terminal may be implemented by using a cell position registered in a Home Location Register (HLR) and using position information from a Global Positioning System (GPS). In addition, the position location service may use a network-based method, with a dedicated network, a method (Angle Of Arrival: AOA) for calculating the position of a mobile communication terminal by measuring the arrival angle of a signal inputted from the mobile communication terminal, and a method (Time Of Arrival: TOA) using time of arrival of electric waves. Moreover, the position location service may also use a hybrid scheme merging two methods to determine a more precise position.

The aforementioned methods are typical technologies for measuring the position of a mobile communication terminal in current mobile communication systems together with GPS, and have a resolution of only several hundreds to dozens of meters because of frequency characteristic limitations and the multi-path characteristics of a Wideband Code Division Multiple Access (WCDMA).

In the prior art, when an emergency occurs as described above, a user has to notify the proper authorities directly with a mobile communication terminal. However, in some emergencies such as a building collapsing, a landslide or a kidnapping, the user cannot use the mobile terminal. In addition, when an emergency occurs in a blanket area, such as where a building collapses, it is difficult to determine the user's position because electric waves are not transmitted through the rubble, and the resolution is very low.

For example, in the prior art, when a victim leaves a mobile communication service area and gets lost in the mountains, or when a mountain disaster or forest fire occurs, it is impossible to notify the authorities of the emergency or determine the victim's exact position by the conventional methods.

SUMMARY OF THE INVENTION

Accordingly, the present invention has been made to solve the above-mentioned problems occurring in the prior art, and an object of the present invention is to provide an apparatus and a method capable of transmitting/receiving emergency rescue signals by means of UWB signals in a mobile communication terminal when emergencies occur.

In accordance with one aspect of the present invention, there is provided an emergency rescue request method using Ultra-Wideband (UWB) signals in a mobile communication terminal, the emergency rescue request method including receiving a control message including control contents for an emergency rescue mode of the mobile communication terminal; shifting to the emergency rescue mode according to the received control message; generating the UWB rescue signals when the mobile communication terminal is in the emergency rescue mode; and transmitting the generated UWB rescue signals.

In accordance with another aspect of the present invention, there is provided a method for transmitting an emergency rescue request using Ultra-Wideband (UWB) signals in a mobile communication terminal, the method including obtaining GPS position information when the mobile communication terminal is in an emergency rescue request mode; generating the UWB rescue signals including the obtained GPS position information and information for the terminal; and transmitting the generated UWB rescue signals.

In accordance with further another aspect of the present invention, there is provided an emergency rescue request apparatus using Ultra-Wideband (UWB) signals, the apparatus including a received signal strength measurement unit for periodically measuring Received Signal Strength Indication (RSSI); a baseband processor for generating a final bit stream including a bit stream, which has a predetermined pattern representing emergency rescue request signals, and information for the apparatus; a UWB signal output unit for outputting the UWB signals obtained by UWB-modulating the final bit stream provided from the baseband processor; and a controller for recognizing occurrence of an emergency according to an output value from the received signal strength measurement unit, providing the baseband processor with the bit stream, which has the predetermined pattern representing the emergency rescue request signals, and the information for the apparatus, and thus controlling the UWB signals to be transmitted from the apparatus.

In accordance with still another aspect of the present invention, there is provided an emergency rescue request apparatus using Ultra-Wideband (UWB) signals, the apparatus including a baseband processor for generating a final bit stream including a bit stream, which has a predetermined pattern representing emergency rescue request signals, and information for the apparatus; a UWB signal output unit for outputting the UWB signals obtained by UWB-modulating the final bit stream provided from the baseband processor; and a controller for receiving a control message including control contents for an emergency rescue mode, analyzing the received control message, generating the UWB signals according to the analysis result, and controlling the UWB signals to be transmitted from the apparatus.

In accordance with yet another aspect of the present invention, there is provided an apparatus for receiving an emergency rescue request using Ultra-Wideband (UWB) signals, the apparatus including a UWB signal receiver having four antennas for receiving UWB signals from a predetermined terminal; a UWB signal amplifier for amplifying signals inputted from the UWB signal receiver; a cross-correlator for cross-correlating signals inputted from the UWB signal amplifier; a peak detector for detecting a peak value through a value outputted from the cross-correlator and calculates time difference; a coordinate operation unit for calculating a position coordinate of the terminal by means of the time difference calculated through the peak detector; and a coordinate display unit for displaying the calculated position coordinate.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments according to the present invention will be described with reference to the accompanying drawings. The same reference numerals are used to designate the same elements as those shown in other drawings. In the following description of the present invention, a detailed description of known functions and configuration incorporated herein will be omitted when it may make the subject matter of the present invention unclear.

In the present invention, when emergencies such as a building collapse or a landslide occurs, it is possible to provide the location where the emergency has occurred via a mobile communication terminal. For providing such a function, when such an emergency has occurred, a rescue request may be performed according to three embodiments of the present invention.

In the first embodiment, a victim carrying a corresponding terminal presses an emergency rescue request key and is then connected to a rescue center, so that the victim can notify the rescue center of the victim's general position through communication with a counselor.

In the second embodiment, particularly useful when a victim gets lost in the mountains, etc., and does not know his general position, the victim presses an emergency rescue request key, and is connected to a rescue center. GPS information, indicating the victim's location, is simultaneously and automatically transmitted to the rescue center. In this way, the victim can notify the rescue center of the victim's position.

In the third embodiment, when the victim cannot directly report an emergency to a rescue center, another person having recognized the situation reports the emergency to the rescue center. In this way, the rescue center can determine the general position at which the emergency has occurred.

When the rescue request is accepted through the aforementioned methods, the rescue center sends a rescue team to the determined position based on the GPS position information or the reporter's statement, and finds out an exact point for the corresponding terminal by means of a searching apparatus according to the present invention.

Herein, the rescue team receives UWB signals from the victim's corresponding terminal at the determined position through the searching apparatus, and finds the victim's exact position. Herein, the searching apparatus uses a UWB scheme to overcome the limitation of the frequency characteristics and the multi-path characteristics of a Wideband CDMA.

When the emergency occurs, the UWB signals may be sent from the corresponding terminal when the victim presses the emergency rescue request key. The UWB signals may be sent automatically when the corresponding terminal cannot communicate when the service area changes to a blanket area from a sudden disaster. Alternatively, the UWB signals may be sent when a control message is received from the rescue center or from the searching apparatus. In particular, since the UWB signals have a maximum transmission distance of 100 m, the rescue team will arrive at the general position of the emergency to find out the exact location of the corresponding terminal using the searching apparatus.

Before a description about the present invention is given, the UWB will be briefly described hereinafter.

A UWB scheme is a wireless communication scheme for providing information by means of a wide frequency band of more than several GHz. UWB schemes use a very narrow pulse of several nanoseconds or several picoseconds, to share and use a frequency with very low spectrum power as in the case of noise without interference and influence with a conventional communication system. Therefore, it is possible to use the UWB scheme without the restriction of frequency.

Figure 1:
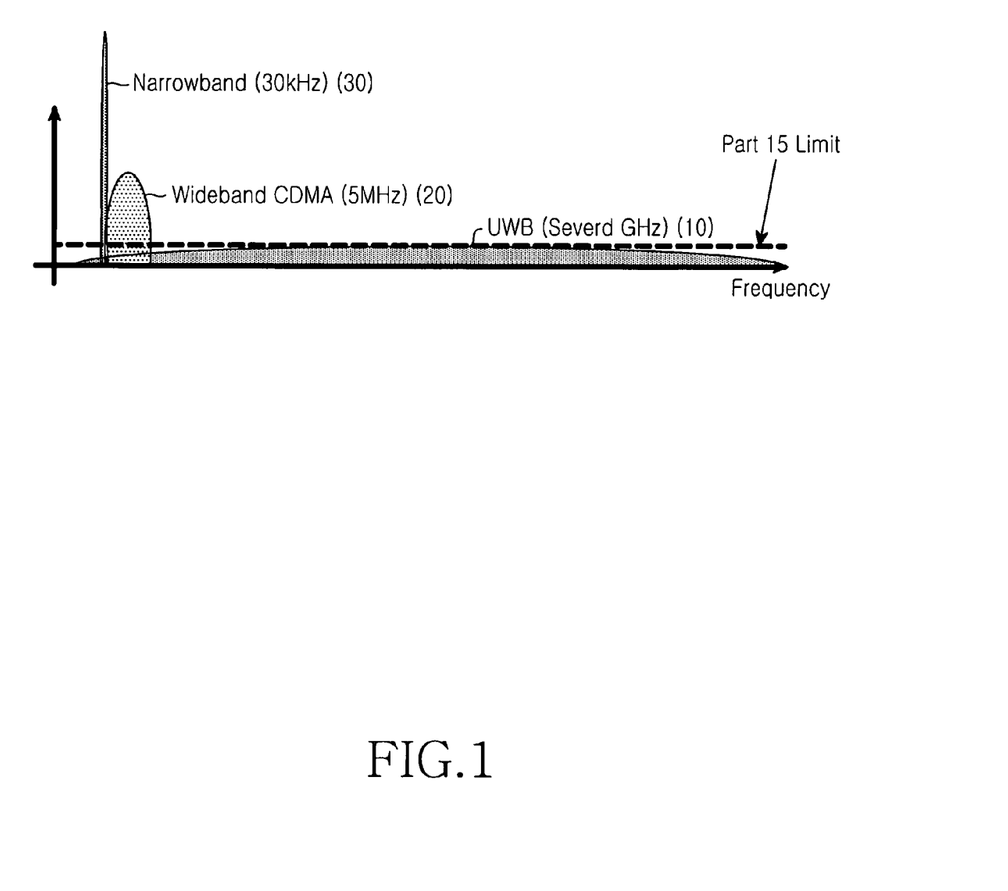
FIG. 1 is a diagram schematically illustrating a spectrum according to each frequency band.

Referring to FIG. 1, when the spectrum distribution of a UWB is compared with a Narrowband scheme (30 KHz) 30 and a Wideband CDMA scheme (5 MHz) 20 as shown in FIG. 1, one can see that the UWB scheme (several GHz) 10 shows a very low power spectrum density over a wide band as compared with other schemes. As a result, the UWB scheme accepts multi-path environments due to such a characteristic.

Further, since the UWB scheme has a high penetration, it can easily penetrate a barrier of nonmetallic material.

When such a characteristic is used, it is possible to receive a signal even in indoor environments or shady environments other than Line-Of-Sight (LOS) environments. Accordingly, the UWB scheme is applied to a position recognition system, so that it is possible to obtain a very high resolution up to a "centimeter" unit at maximum. Further, it is possible to track the exact position of a corresponding terminal through UWB signals when the general position of the corresponding terminal is known. In particular, even though an emergency such as the burying of victims due to a building collapse or landslide, it is possible to find out the exact point at which the victims have been buried by means of UWB signals according to the present invention.

The present invention provides a searching apparatus capable of finding the exact position of a corresponding terminal when an emergency occurs. When the UWB signals are transmitted from the corresponding terminal according to the present invention, a searching side can find out the exact point from which the UWB signals are transmitted by means of the searching apparatus.

Herein, the searching apparatus estimates the position at which the emergency has occurred from received UWB signals, calculates the exact position, and displays the calculated position on the screen of the searching apparatus. Herein, when the emergency has occurred, a Time Difference Of Arrival (TDOA) scheme may be used as a method for finding out the exact position of the corresponding terminal.

Herein, a TDOA scheme refers to a scheme for determining a position by means of arrival time difference between signals transmitted from different places. Specifically, a searching side can measure arrival time difference of electric waves, which is proportional to the difference between distances from two base stations to a terminal, by means of this TDOA scheme, and determine that the terminal is located at a place having a constant difference of distances from the two base stations, that is, the terminal is located on a hyperbola employing the two base stations as focuses. Similarly, the searching side can measure arrival time difference of electric waves transmitted from three or more base stations, and determine that the terminal is located on the intersection of hyperbolas employing each base station as a focus.

Figure 2:
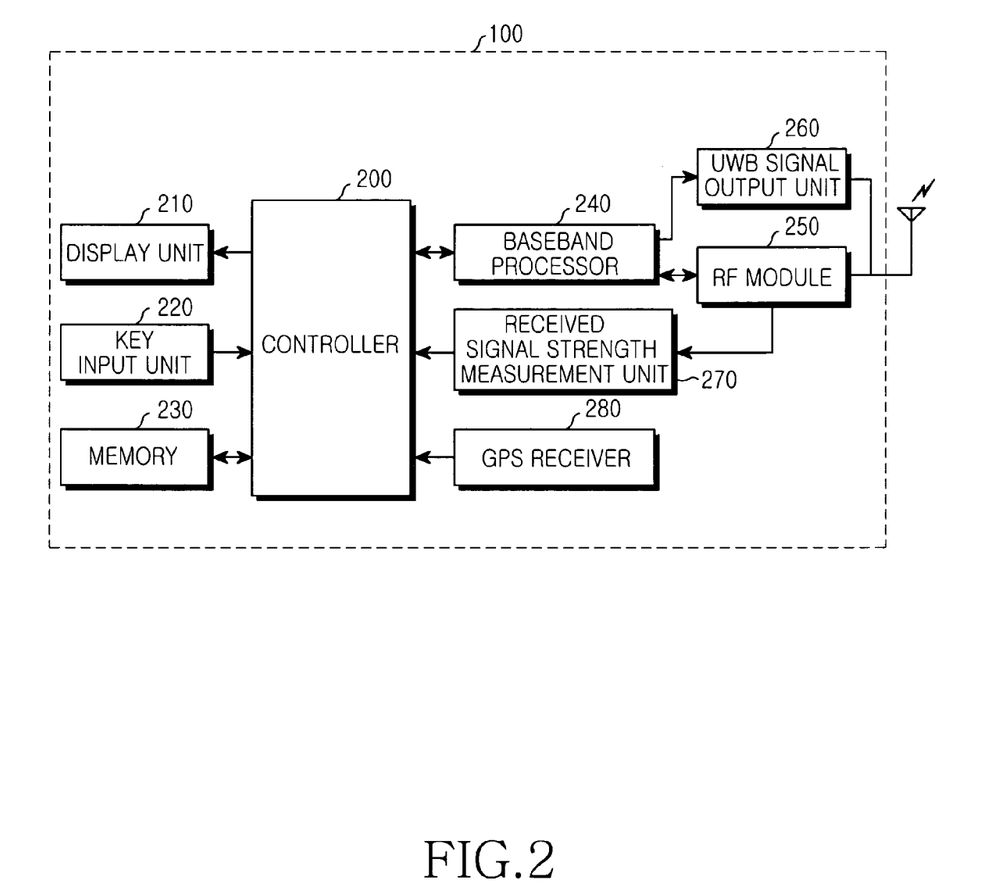
FIG. 2 is a block diagram of the corresponding terminal capable of requesting an emergency rescue according to an embodiment of the present invention.

Hereinafter, the operation of a corresponding terminal capable of requesting an emergency rescue will be described with reference to FIG. 2. FIG. 2 is a block diagram of the corresponding terminal capable of requesting an emergency rescue according to an embodiment of the present invention.

First, a controller 200 controls the general operation of the corresponding terminal 100 such as the typical implementation of wireless communication and data processing.

This controller 200 performs other operations according to an embodiment of the present invention. First, when a victim presses an emergency rescue request key for requesting a rescue, the controller 200 controls a communication path to a rescue center to be formed. Accordingly, when the terminal is connected to the rescue center, the victim explains the victim's general position to a counselor. Then, the counselor sends a rescue team to the general position reported by the victim and the rescue team starts searching operations. In the following description, searching operations refers to a process in which the rescue team finds the position of the corresponding terminal transmitting UWB signals from a searching apparatus according to an embodiment of the present invention.

Further, according to another embodiment of the present invention, when a victim presses an emergency rescue request key, the controller 200 controls a corresponding terminal carried by the victim to be connected to a rescue center and simultaneously transmits GPS position information for the corresponding terminal. In addition, a third party may report a position at which an emergency has occurred to the rescue center, so that a rescue team can perform searching operations at a general position at which the emergency has occurred.

In the methods as described above, when a victim presses an emergency rescue request key, the controller 200 controls a corresponding terminal to be connected to a rescue center and to transmit UWB signals. For this control, the controller 200 transfers a bit stream, which has a predetermined pattern representing emergency rescue signals, and information used for disclosing the victim's identity to a baseband processor 240.

Further, the controller 200 controls UWB signals to be transmitted at a predetermined time, that is, a time point at which a service area changes to a blanket area due to the occurrence of an emergency such as a building collapsing. In other words, the controller 200 periodically measures Received Signal Strength Indication (RSSI). Then, when the corresponding terminal cannot communicate for more than a predetermined time period, the controller 200 controls the UWB signals to be automatically transmitted. This is to allow automatic transmission of the UWB signals when the victim becomes unconscious and cannot press the emergency rescue request key.

In this way, the rescue team arrives at the general position of the emergency by the report of the third party, and receives the automatically transmitted UWB signals via the searching apparatus, so that the rescue team can find out an exact point at which the emergency has occurred. As described above, the controller 200 determines whether the victim has pressed the emergency rescue request key or the corresponding terminal suddenly cannot make communicate for more than a predetermined time period. As a result of the determination, the controller 200 controls transmission of the UWB signals.

A display unit 210 inputs and displays data for key input data inputted from a key input unit 220 under the control of the controller 200, or, displays an operation state and various information of the corresponding terminal 100 by means of icons and characters. Further, when a user sets or operates necessary functions, for example, the user requests an emergency rescue, the display unit 210 allows the transmission state of emergency rescue signals, that is, UWB signals, to be visually shown under the control of the controller 200.

The key input unit 220 has various keys including number keys and provides the controller 200 with the key input data inputted by the user. That is, the key input unit 220 outputs corresponding key input data according to the input of each key. The key input data outputted from the key input unit 220 are inputted to the controller 200. The controller 200 judges key input corresponding to the inputted key input data and then performs a corresponding operation as a result of the judgment. Further, the emergency rescue request key according to an embodiment of the present invention may be separately provided, or its function may be performed by an existing function key performing other functions.

A memory 230 connected to the controller 200 includes a Read Only Memory (ROM) and a Random Access Memory (RAM) for storing multiple programs and information for controlling the operation of the corresponding terminal 100, a voice memory, etc.

Further, a Radio Frequency (RF) module 250 transmits/receives RF signals to/from a base station through an antenna. That is, the RF module 250 converts the received RF signals to Intermediate Frequency (IF) signals and outputs the converted signals to the baseband processor 240. In contrast, the RF module 250 converts IF signals inputted from the baseband processor 240 to RF signals and transmits the RF signals. Herein, the baseband processor 240 is a Baseband Analog ASIC (BAA) providing an interface between the controller 200 and the RF module 250. That is, the baseband processor 240 converts baseband digital signals applied from the controller 200 into analog IF signals and applies them to the RF module 250. In contrast, the baseband processor 240 converts analog IF signals applied from the RF module 250 to baseband digital signals and applies them to the controller 200.

In particular, the baseband processor 240 receives the bit stream, which has the predetermined pattern representing the emergency rescue signals, and the information for the corresponding terminal from the controller 200 according to an embodiment of the present invention. Herein, the information for the corresponding terminal is information enabling a searching side to disclose the identity of a victim and includes the phone number of the corresponding terminal, etc. Further, the baseband processor 240 generates a final bit stream to be transmitted by means of a Medium Access Control (MAC) disclosed in the IEEE 802.15.3 standard, and transfers the final bit stream to a UWB signal output unit 260. Then, the UWB signal output unit 260 UWB-modulates the bit stream provided from the baseband processor 240 under the control of the controller 200, and transmits the modulated bit stream to the searching apparatus.

Preferably, the controller 200 periodically measures a RSSI through a received signal strength measurement unit 270 to determine the occurrence of a blanket area due to an emergency. The received signal strength measurement unit 270 periodically measures the RSSI, compares the measured RSSI with a reference RSSI, and provides the controller 200 with the result of the comparison. In particular, when the measured RSSI shows a remarkable difference of more than a predetermined value in comparison with the reference RSSI at a predetermined time point, it may be determined that a service area has changed to a blanket area due to an emergency. Otherwise, when the measured RSSI is smaller than the reference RSSI representing the occurrence of an emergency, an emergency condition may be determined the same as above.

Further, the corresponding terminal 100 according to the present invention further includes a GPS receiver 280 for receiving GPS signals received from a GPS satellite. The controller 200 transmits signals (i.e., GPS position information) provided from the GPS receiver 280 to the rescue center to find the general position of the corresponding terminal 100 when the rescue request key has been pressed.

Figure 3:
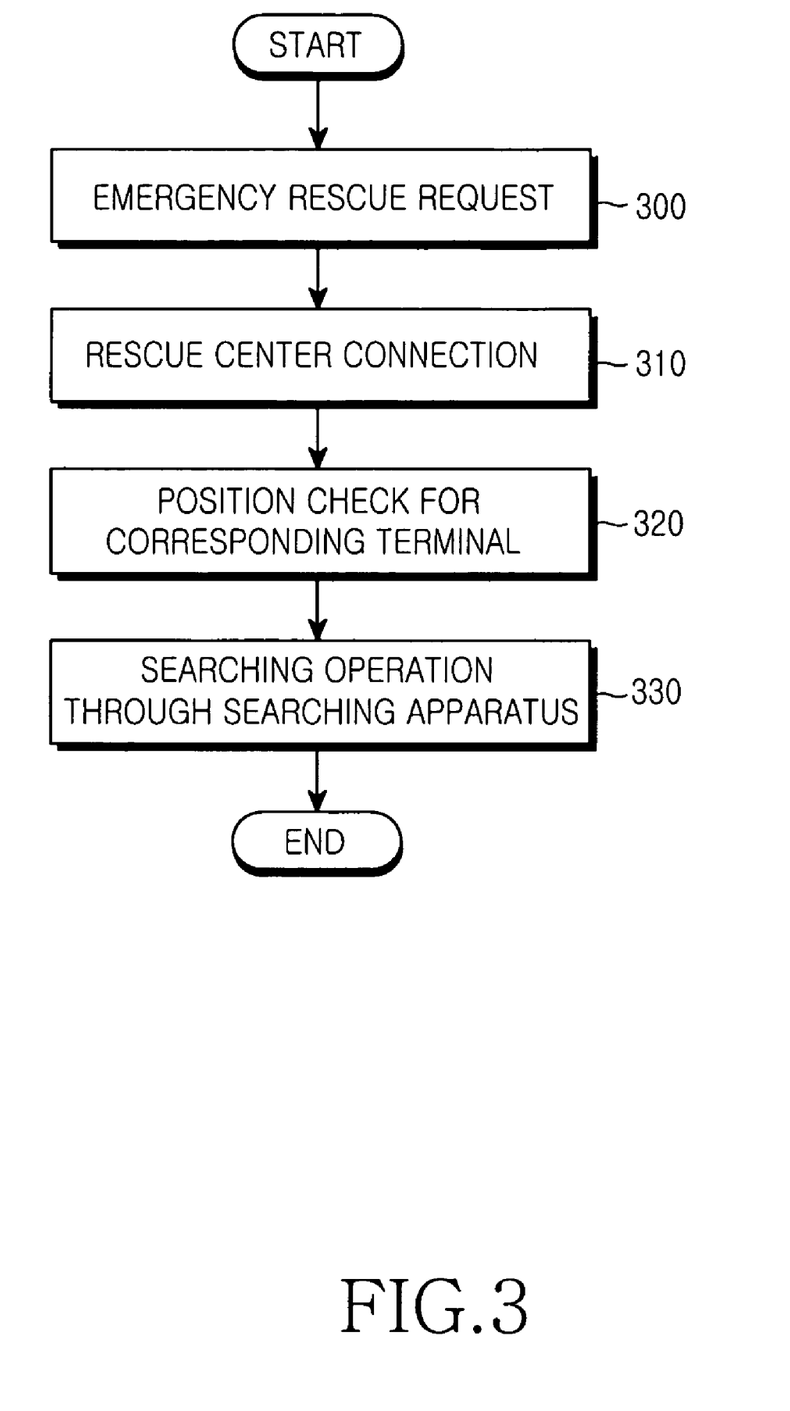
FIG. 3 is a flow diagram schematically illustrating a searching operation process subsequent to the emergency rescue request according to an embodiment of the present invention.

Hereinafter, a searching operation process after an emergency rescue request according to an embodiment of the present invention will be described with reference to FIG. 3. FIG. 3 is a flow diagram schematically illustrating the searching operation process subsequent to the emergency rescue request.

As shown in FIG. 3, the searching operation process includes an emergency rescue request at step 300, a rescue center connection at step 310, a position check step at step 320 for a corresponding terminal, and a searching operation at step 330 through a searching apparatus.

First, the emergency rescue request step 300 is a step in which a victim requests a rescue by pressing the emergency rescue request key of the corresponding terminal or a third party requests a rescue after recognizing the occurrence of an emergency. Herein, when the victim presses the emergency rescue request key, a report is accepted at a rescue center through a typical mobile communication network and UWB signals are generated. That is, the UWB signals are generated when the emergency rescue request key is pressed. Alternatively, the UWB signals may be automatically generated when the corresponding terminal is located in a blanket area for a predetermined time period.

Next, the rescue center connection step 310 is a step in which the victim communicates with the counselor of the rescue center and describes the victim's position after directly pressing the emergency rescue request key, or in the case where a third party directly dials the rescue center, the third party describes a position at which the emergency has occurred.

Then, the position check step 320 for the corresponding terminal is a step in which the rescue center determines the general position of the corresponding terminal by means of the contents reported by the victim or the third party, or, GPS position information received in the rescue center.

Lastly, the searching operation step 330 is a step in which a rescue team accepting the report goes to the determined position, receives the UWB signals transmitted from the victim's corresponding terminal, finds the exact position at which the corresponding terminal is located through the UWB signals, and then performs rescue operations.

As described above, the rescue center determines the general position of the corresponding terminal by GPS position information or information the reporter of the emergency, and then sends the rescue team to the position. Then, the rescue team can find out the exact position of the emergency by means of the UWB signals received through the searching apparatus.

In the following description, to receive the UWB signals having a maximum transmission distance of 100 m and perform a position tracking, it is preferred that the rescue team starts the searching operations at the general position at which the emergency has occurred.

The UWB signals are transmitted when the victim requests a rescue by directly pressing the emergency rescue request key. However, it may be possible that the victim becomes unconscious and cannot press the emergency rescue request key when an emergency such as a building collapse or a landslide occurs. Hereinafter, a case in which the victim cannot request a rescue by directly pressing the emergency rescue request key will be described with reference to FIG. 4 which is a flow diagram illustrating a process for transmitting the UWB signals from the corresponding terminal to the searching apparatus according to an embodiment of the present invention.

Figure 4:
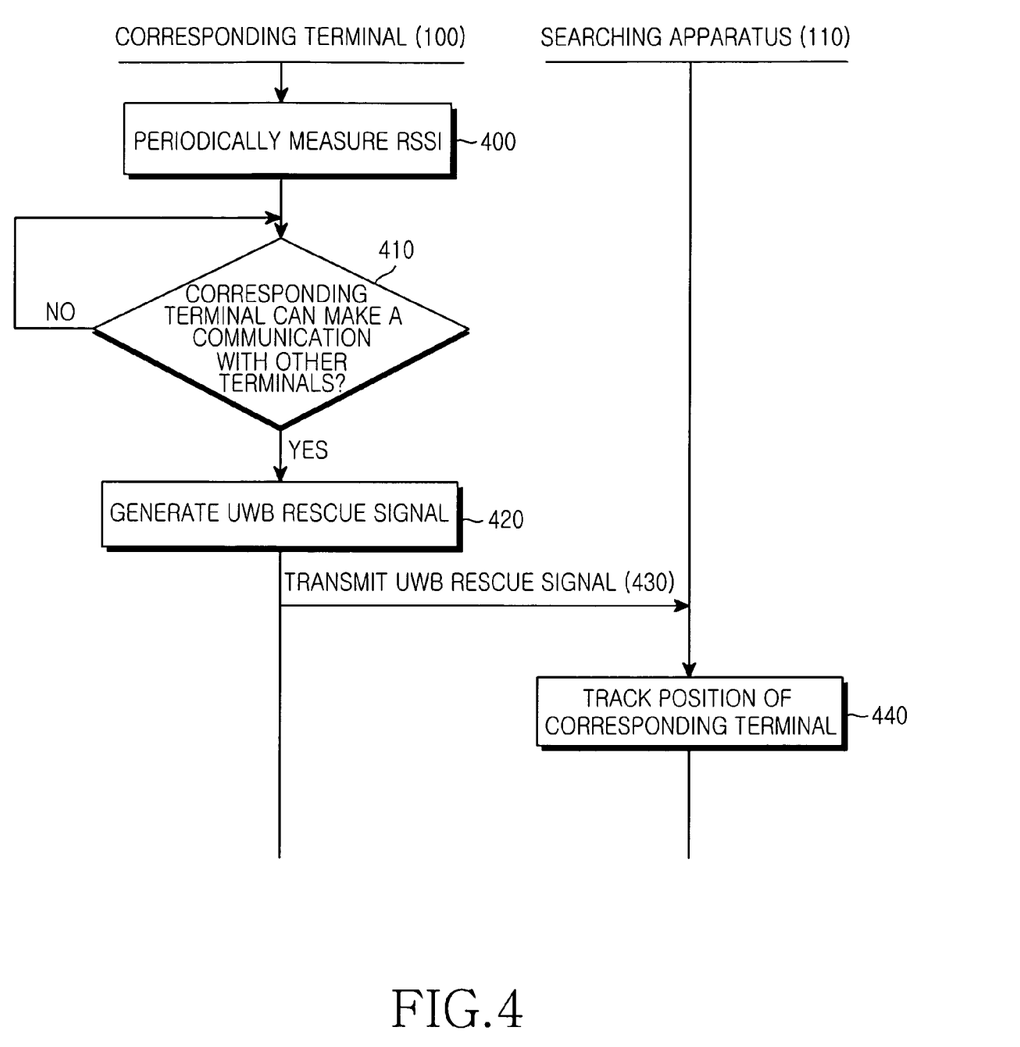
FIG. 4 which is a flow diagram illustrating a process for transmitting UWB signals from a corresponding terminal to a searching apparatus according to an embodiment of the present invention.

First, the corresponding terminal 100 periodically measures a RSSI through the received signal strength measurement unit 270 in step 400. Then, the corresponding terminal 100 determines whether the corresponding terminal 100 can communicate with other terminals in step 410.

The criteria for determining whether the corresponding terminal 100 can communicate with other terminals are as follows. In the first criterion, the corresponding terminal 100 periodically measures the RSSI and determines whether the measured RSSI is smaller than the reference RSSI representing the occurrence of an emergency. As a result of the determination, when the measured RSSI is smaller than the reference RSSI, the corresponding terminal 100 shifts to an emergency rescue mode. In the second criterion, when the measured RSSI has a big difference from the reference RSSI, the corresponding terminal 100 shifts to an emergency rescue mode. Herein, the reference RSSI may be determined in advance through negotiation with the carrier, or mobile communication service provider.

As a result of the determination, when a RSSI, which represents that the corresponding terminal 100 cannot make a communication with other terminals due to an emergency, is measured, the corresponding terminal 100 generates and transmits the UWB signals in step 420. Then, the searching apparatus 110 detects the UWB signals and tracks the victim's exact position in step 440 by tracking the position of the mobile terminal 100.

For example, even though the victim becomes unconscious due to an emergency such as landslide, the corresponding terminal can determine that it suddenly cannot make a communication with other terminals through the periodic measurement of the RSSI. Accordingly, the searching apparatus receives the automatically transmitted UWB signals, calculates the exact point, and displays the calculated point on a screen, thereby allowing a rescue team to find out the victim's position.

When a victim cannot send emergency rescue request signals to a rescue center due to an emergency, the rescue center or a searching apparatus can remotely transmit a control message allowing UWB signals to be transmitted from a corresponding terminal in an alternative embodiment of the present invention.

Figure 5:
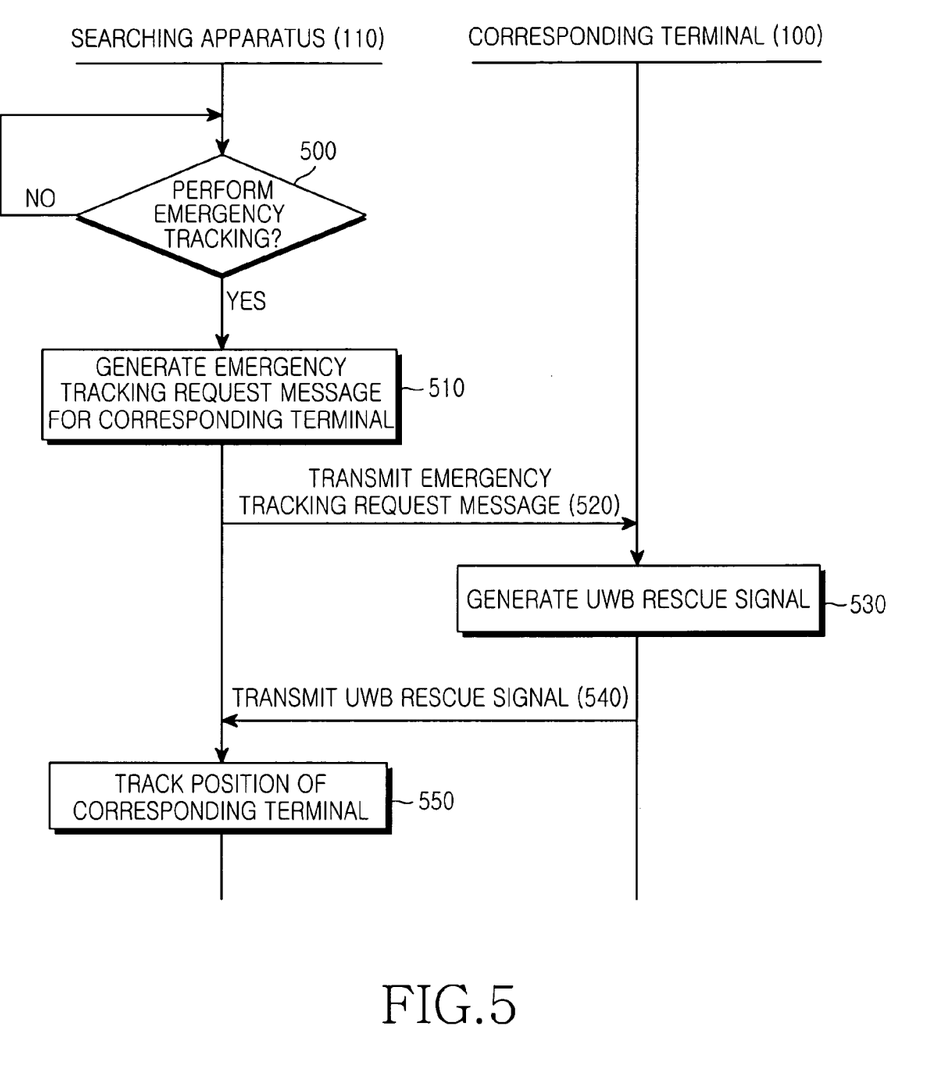
FIG. 5 is a flow diagram illustrating a UWB signal request process from a searching apparatus according to an embodiment of the present invention.
Figure 6:
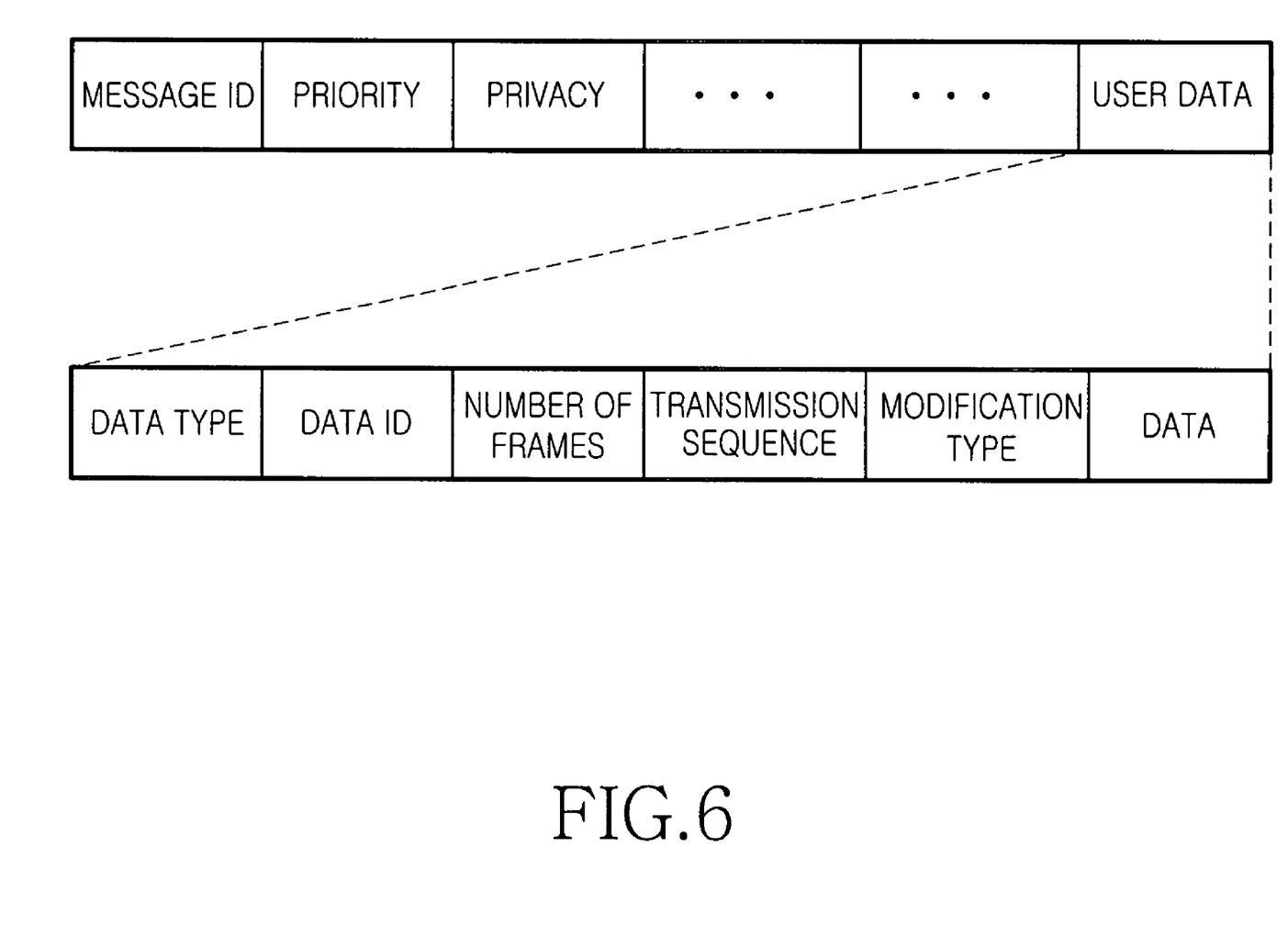
FIG. 6 is a diagram illustrating a format structure of a control message according to an embodiment of the present invention.
Figure 7:
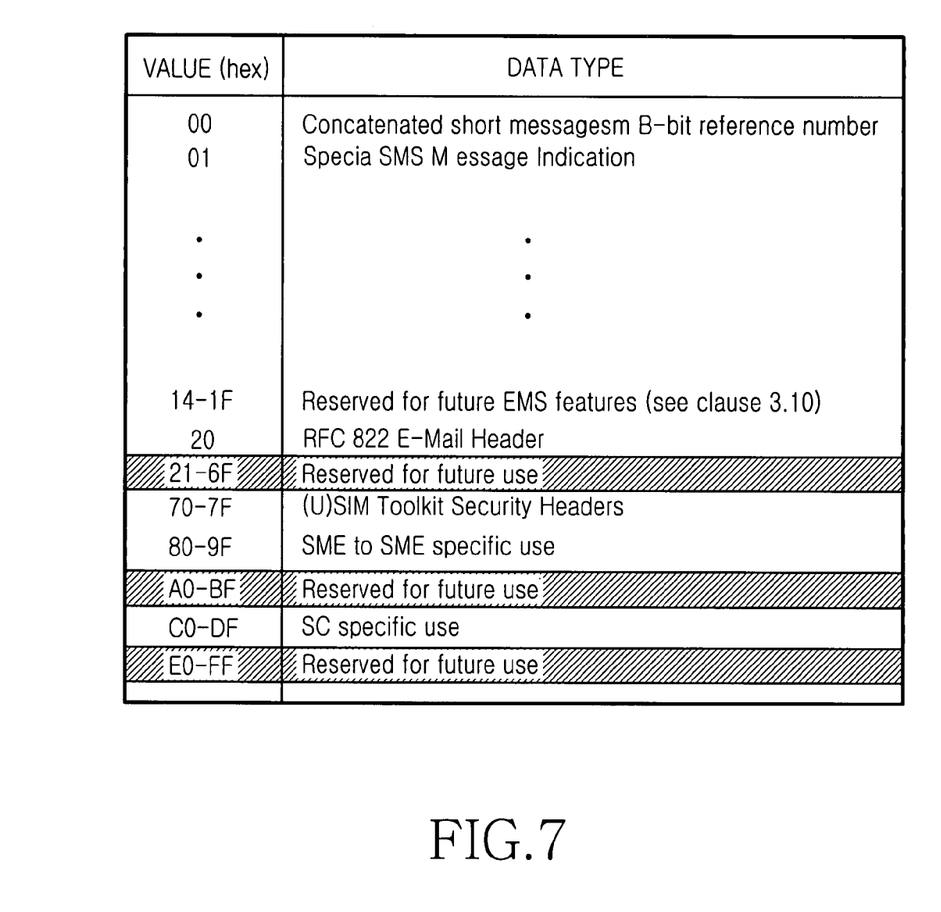
FIG. 7 is a diagram illustrating the construction example of a data type in the format of the control message of FIG. 6 according to an embodiment of the present invention.

Hereinafter, a process for transmitting the control message allowing transmission of the UWB signals from the searching apparatus to the corresponding terminal will be described with reference to FIGS. 5 to 7. FIG. 5 is a flow diagram illustrating a UWB signal request process of the searching apparatus; FIG. 6 is a diagram illustrating a format structure of a control message; and, FIG. 7 is a diagram illustrating the construction example of a data type in the format of the control message of FIG. 6.

First, when a report notifying the occurrence of an emergency is accepted, the rescue center registers information for a corresponding terminal to be urgently tracked. Herein, the report is a report for requesting an emergency tracking for the corresponding terminal located at a place at which the emergency has occurred. The report may be generated by a rescue request of a victim carrying the corresponding terminal, the family who desire to find the victim, or persons around the place at which the emergency has occurred. Further, the information for the corresponding terminal includes the phone number and general position information of the corresponding terminal. Accordingly, the rescue center can send a rescue team to the general position at which the emergency has occurred.

The rescue team receives the UWB signals through the searching apparatus to find the victim's exact position. The searching apparatus includes a function for controlling the UWB signals transmitted from the corresponding terminal. In addition, the rescue center may also control the UWB signals when the rescue center accepts the report. Such control is effected by transmission of a predetermined control message to the corresponding terminal.

Hereinafter, the process in which the searching apparatus controls the UWB signals transmitted from the corresponding terminal will be described with reference to FIG. 5.

First, after the rescue team arrives at the general position where the emergency occurred, the rescue team transmits the control message to the corresponding terminal 100 through the searching apparatus 110.

Specifically, the searching apparatus 110 determines whether key input for performing an emergency tracking is received from the rescue team in step 500. When the key input for performing the emergency tracking is received from the rescue team, the searching apparatus 110 generates an emergency tracking request message, which is a control message including control contents for an emergency rescue mode of the corresponding terminal 100, in step 510. Then, in step 520, the generated emergency tracking request message is transmitted to the corresponding terminal 100.

When the emergency tracking request message is received from the searching apparatus 110, the corresponding terminal 100 shifts to the emergency rescue mode. Then, the corresponding terminal 100 analyzes the emergency tracking request message and generates UWB signals according to the analysis result in step 530. The process of generating the UWB signals occurs as described above. The corresponding terminal 100 transmits the generated UWB signals to the searching apparatus 110 in step 540. Accordingly, the searching apparatus 110 starts to track the exact position of the corresponding terminal 100 in step 550. Herein, the tracking of the exact position is performed by means of an algorithm according to an embodiment of the present invention.

Before a detailed description about this searching apparatus is given, the aforementioned emergency tracking request message will be described.

The emergency tracking request message is the control message which includes the control contents for the emergency rescue mode of the corresponding terminal 100 and controls the UWB signals to be transmitted from the corresponding terminal 100. The emergency tracking request message may be transmitted by means of a Short Message Service (SMS). In order to transmit the emergency tracking request message from the rescue center or the searching apparatus 110 to the corresponding terminal 100, a message format is determined in advance, which represents that the emergency tracking request message is a message allowing transmission of the UWB signals, between the rescue center or the searching apparatus 110 and the corresponding terminal 100.

The emergency tracking request message has a typical short message format as shown in FIG. 6. One frame of the short message includes a message ID field for identification of the message, a priority field representing the priority of the short message, a privacy field, user data field and various fields necessary for transmission/reception of the short message. Herein, the user data field is a field representing actual data transmitted from a caller to a receiver in a general short message. In the user data field, predetermined upper bytes are used for representing that the emergency tracking request message is a message allowing transmission of the UWB signals.

In particular, a "DATA TYPE" field of the "USER DATA" field designates a data type and represents the type of transmitted data as shown in FIG. 7. Referring to FIG. 7, the "DATA TYPE" field includes specific codes according to the type of transmitted data. From among these codes, data representing the emergency tracking request message is defined in number portions reserved for future use, which have hexa values of 21-6F, A0-BF and E0-FF. Accordingly, when the above hexa values are recorded in the first byte of the "USER DATA" field, it can be understood that the data recorded in the "DATA TYPE" field is the emergency tracking request message.

In detail, in a 3GPP TS 23.040 of an SMS standard, when a TP-User Data Header Indicator (TP-UDHI) has a value of 1, the existence of a Transfer layer Protocol-Use Data Header (TP-UDH) is defined in the user data field and specific attribute is assigned to the user data of the short message by means of the TP-UDH. In particular, the structure of the TP-UDH defined in the 3GPP TS 23.040 includes an Information Element Identifier (IEI) and an Information Element Data (IED).

In accordance with an embodiment of the present invention, a new IEI for UWB is defined in number portions reserved for future use. Accordingly, the searching apparatus allows the corresponding terminal to determine whether a corresponding IEI is included in the header of a received emergency tracking request message. When the corresponding IEI is included in the header, the searching apparatus forcedly operates a function in which the corresponding terminal recognizes that the received message is the emergency tracking request message and transmits the UWB signals.

In one example of the TP-UDH proposed by the embodiment of the present invention, "TP-UDHI=1" is defined, and "UDHL=3", "IEI=0×40" "IEDL=1" and "IED=0×32" are defined in an SMS User Data Header. This means that a Tx output value is required to have a value of −50 dBm. Herein, the IEI denotes 'UWB Requested Transmission Power' and the IED denotes 'Requested Transmission Power (−dBm)'. As described above, it is possible to control the transmission of the UWB signals by means of the SMS. Accordingly, when the UWB signals received in the searching apparatus are weak, the rescue team can perform the searching operations by gradually increasing the output power of the searching apparatus.

The emergency tracking request message includes a predetermined code representing that the emergency tracking request message is a control message for controlling the UWB signals to be transmitted from the corresponding terminal 100. In addition, the emergency tracking request message includes a predetermined code value for controlling an output value at which the UWB signals are outputted. Accordingly, the corresponding terminal 100 may determine the output value of the UWB signals according to the predetermined code value for controlling the output value at which the UWB signals are outputted.

Hereinafter, a process for finding a victim by calculating the exact point of the corresponding terminal through the searching apparatus after the UWB signals have been manually or automatically transmitted from the corresponding terminal according to an embodiment of the present invention will be described.

Figure 8:
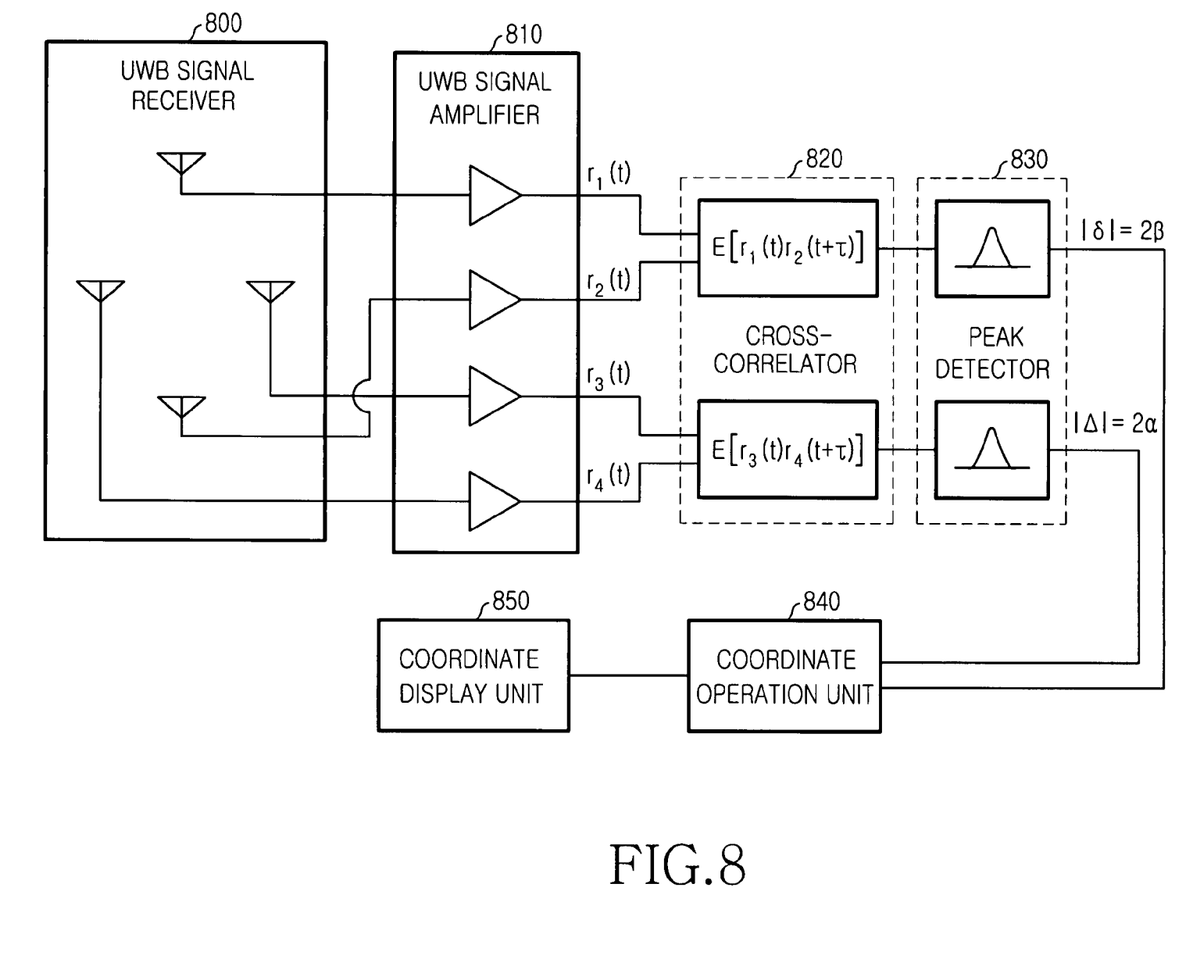
FIG. 8 is a block diagram schematically illustrating the construction of a searching apparatus according to an embodiment of the present invention.

The searching apparatus denotes an apparatus for searching the position of the corresponding terminal transmitting the UWB signals and has the construction as shown in FIG. 8, which is a block diagram schematically illustrating the construction of the searching apparatus.

As shown in FIG. 8, the searching apparatus includes a UWB signal receiver 800 having four antennas for receiving UWB signals, a UWB signal amplifier 810 for amplifying received UWB signals, a cross-correlator 820 for cross-correlating received signals, a peak detector 830, a coordinate operation unit 840 and a coordinate display unit 850. The peak detector 830 detects a peak value outputted from the cross-correlator 820 and calculates time difference between two received signals correlated to each other. The coordinate operation unit 840 calculates a position coordinate of a victim by means of the time difference calculated by the peak detector 830. The coordinate display unit 850 displays a final position coordinate.

Figure 9:
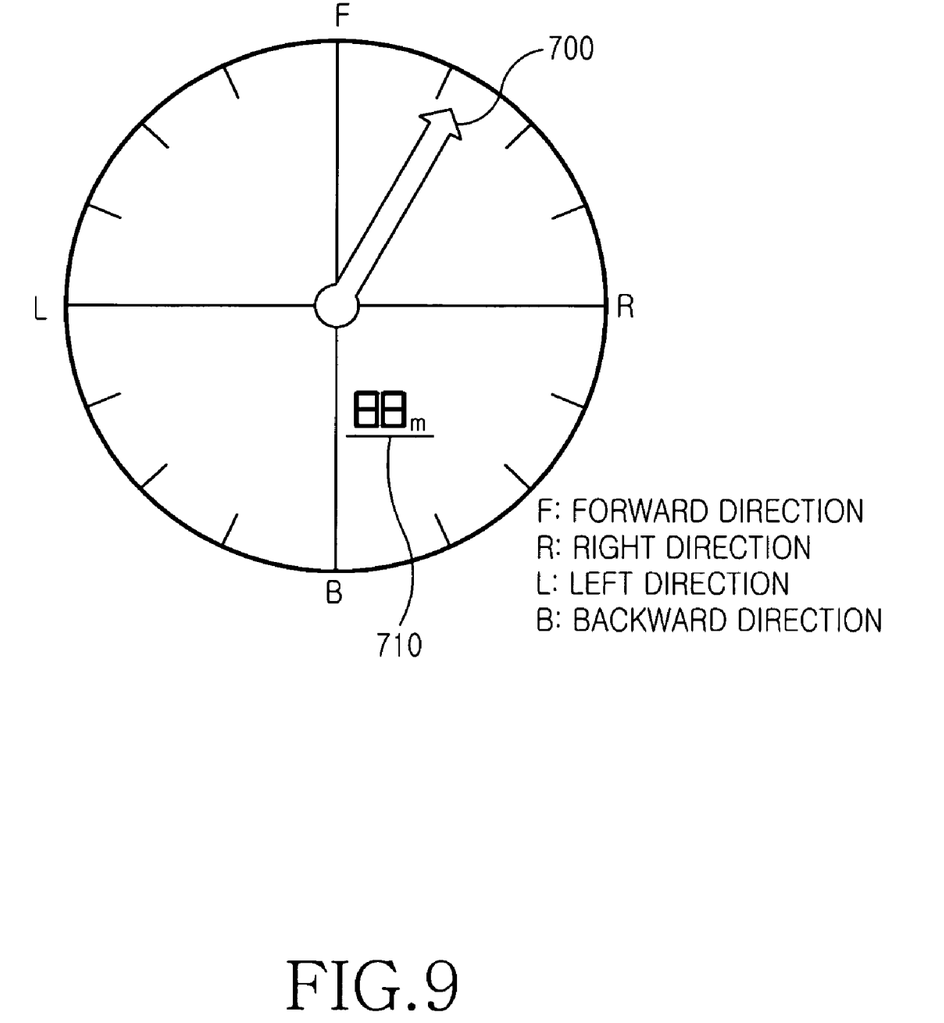
FIG. 9 is a diagram illustrating the screen of a searching apparatus for displaying the position of a corresponding terminal according to an embodiment of the present invention.

Herein, the screen of the searching apparatus, that is, the coordinate display unit 850 displays distance between searching apparatus and the corresponding terminal 100 and direction based on the searching apparatus as described in FIG. 9. FIG. 9 is a diagram illustrating the screen of the searching apparatus for displaying the position of the corresponding terminal 100 according to an embodiment of the present invention. In other words, in FIG. 9, relative distance between the corresponding terminal 100 and the searching apparatus is displayed on the coordinate display unit 850 through a number 710. Further, the direction of the corresponding terminal 100 with respect to the searching apparatus is displayed on the coordinate display unit 850 by a needle 700 pointing in the direction of the corresponding terminal 100.

The searching apparatus uses a TDOA scheme as a positioning method for receiving UWB signals and calculating the position of the corresponding terminal. In the prior art, since the coordinate (i.e., measurement position of electric wave) of a base station has a random position, it is necessary to solve a nonlinear equation to calculate the coordinate of the intersection of two hyperbolas. For this, it is necessary to use methods proposed by Taylor series, Chan and Ho. However, in these methods, their algorithm is complicated and calculations are complex. As a result, a simplified algorithm is needed.

Hereinafter, such an algorithm regarding a method for tracking the corresponding terminal according to an embodiment of the present invention will be described.

Figure 10:
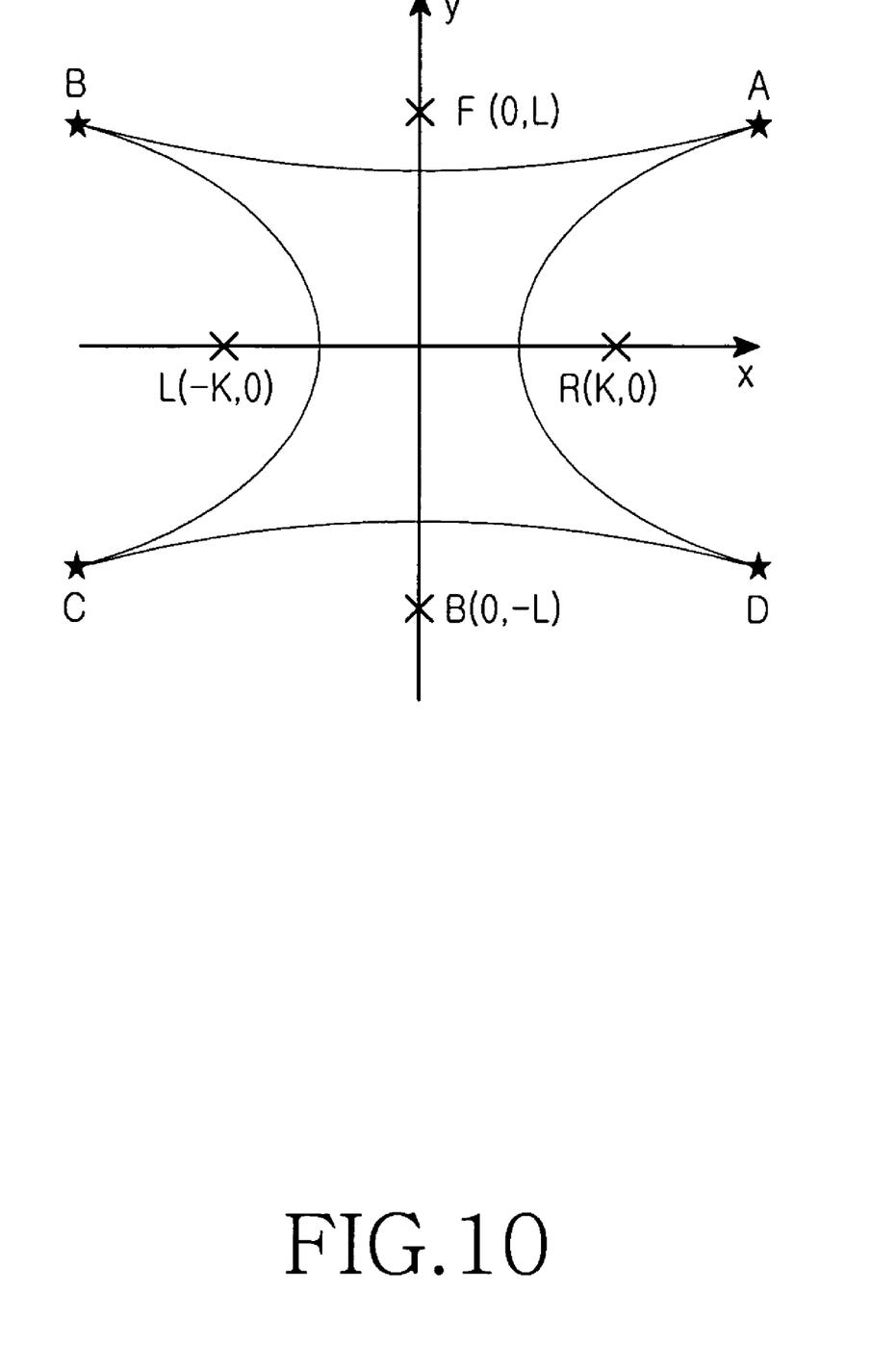
FIG. 10 is a diagram illustrating a method for finding out the position of a corresponding terminal according to an embodiment of the present invention.

To easily obtain the intersection of two hyperbolas, antennas are restrictively disposed as shown in FIG. 10. That is, four antennas are determined to be disposed at positions L, R, F and B. Further, the four antennas are disposed in such a manner that the four antennas form a lozenge having diagonal lines with lengths of 2 L and 2K and the coordinates of each antenna are R(K, 0), L(−K, 0), F(0, L) and B(0, −L) with respect to the origin.

Herein, a hyperbola, which has focuses located at the antennas R and L and includes dots having a constant difference of $2\alpha$ between distances from each dot to the two focuses, is expressed by Equation (1) below. Further, a hyperbola, which has focuses located at the antennas F and B and includes dots having a constant difference $2\beta$ between distances from each dot to the two focuses, is expressed by Equation (2) below.

$$\frac{x^2}{\alpha^2} - \frac{y^2}{b^2} = 1, K^2 = \alpha^2 + b^2, |\Delta| = 2a, K > a > 0 \quad (1)$$

$$\frac{x^2}{\alpha^2} - \frac{y^2}{\beta^2} = 1, L^2 = \alpha^2 + \beta^2, |\delta| = 2\beta, L > \beta > 0 \quad (2)$$

Then, the hyperbolas obtained through Equations (1) and (2) have four intersections. The four intersections may be obtained by Equation (3).

$$x = \pm a\alpha \sqrt{\frac{(b^2 + \beta^2)}{(\alpha^2 b^2 - \alpha^2 \beta^2)}}, y = \pm b\beta \sqrt{\frac{(\alpha^2 + a^2)}{(\alpha^2 b^2 - \alpha^2 \beta^2)}} \quad (3)$$

In Equation (1), the $\Delta$ has a value of $T_L - T_R$ and the $\Delta$ value denotes a value obtained by subtracting the $T_R$, which is a time at which a signal reaches the antenna R, from the $T_L$ which is a time at which a signal reaches the antenna L. In equation 2, the $\delta$ has a value of $T_B - T_F$ and the $\delta$ value denotes a value obtained by subtracting the $T_F$ which is a time at which a signal reaches the antenna F, from the $T_B$ which is a time at which a signal reaches the antenna B.

Then, when the four intersections are obtained by Equation (3), it is possible to determine a direction, that is, a quadrant in which the corresponding terminal is actually located. Herein, the quadrant in which the corresponding terminal is located is determined by pseudo code shown in Table 1. Table 1 represents a pseudo code for selecting the quadrant in which the corresponding terminal is located.

TABLE 1

If Δ > 0 and δ > 0
then
exists in FIRST quadrant
else if Δ < 0 and δ > 0
then
exists in SECOND quadrant
else if Δ < 0 and δ < 0
then
exists in THIRD quadrant
else if Δ > 0 and δ < 0
then
exists in FOURTH quadrant
end When the UWB signals are inputted through the UWB signal receiver 800 of the searching apparatus, the inputted UWB signals are amplified by the UWB signal amplifier 810 connected to the UWB signal receiver 800. As a result of the amplification, signals $r_1(t)$, $r_2(t)$, $r_3(t)$ and $r_4(t)$ are outputted. Then, the signals $r_1(t)$, $r_2(t)$, $r_3(t)$ and $r_4(t)$ are cross-correlated by the cross-correlator 820 and outputted to the peak detector 830. Then, the peak detector 830 calculates a time difference of arrival (i.e., |Δ| and |δ|) of the signals $r_1(t)$ and $r_2(t)$ and the signals $r_3(t)$ and $r_4(t)$. Next, the coordinate operation unit 840 receives the |Δ| and |δ| from the peak detector 830 and calculates an orthogonal coordinate of the corresponding terminal 100 by Equation (3) and the logic in Table 1. In other words, the coordinate operation unit 840 calculates the orthogonal coordinate of the corresponding terminal 100 from the time difference of arrival inputted from the peak detector 830 by means of a TDOA scheme.

The orthogonal coordinate of the corresponding terminal 100 calculated through the aforementioned method is expressed by Equation (4). The R in Equation (4) denotes distance from a central point of the antennas. Further, a polar coordinate for the corresponding terminal 100 is calculated through Equation (5) and expressed by a straight line connecting the antenna L to the antenna R and an angle □ between the antenna L and the antenna R. Accordingly, the distance R and the angle □ calculated through the aforementioned method are displayed on the coordinate display unit 850 through the distance 710 and the direction 700 of an arrow as shown in FIG. 9. The following Equations (4) and (5) are equations for indicating distance and direction between the searching apparatus and the corresponding terminal as relative distance and direction from the origin.

$$R = \sqrt{x^2 + y^2} \quad (4)$$

$$\theta = \tan^{-1}\left(\frac{y}{x}\right) \quad (5)$$

According to the present invention as described above, in relation to a method for tracking a corresponding terminal, it is possible to easily find out the position of the corresponding terminal transmitting UWB signals through an algorithm which is a simply standardized equation. Further, a position tracking is performed through a small searching apparatus instead of a base station, so that a rescue team can perform rescue operations with the searching apparatus. Therefore, it is possible to perform more quick and effective rescue operations. That is, when the present invention is complementarily used with a GPS illustrating a relatively macroscopic position, it is possible to quickly find out the exact position of the corresponding terminal.

Furthermore, according to the present invention, a UWB receiver is miniaturized and the time-resolution in a cross-correlator increases due to the development of MEMS technology, so that a searching apparatus can be mounted on a mobile communication terminal. Therefore, the present invention can be used in not only rescue operations but also various location-based services such as searching for a missing child and searching for a car in a parking place.

Although a preferred embodiment of the present invention has been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. An emergency rescue request method using Ultra-Wideband (UWB) signals in a mobile communication terminal, the method comprising the steps of:
    receiving a control message including control contents for an emergency rescue mode of the mobile communication terminal;
    shifting to an emergency rescue mode for generating a UWB signal according to the received control message;
    generating UWB signals when the mobile communication terminal is in the emergency rescue mode; and
    broadcasting the generated UWB signals;
    wherein the step of generating the UWB signals comprises generating a final bit stream that includes a bit stream, which has a predetermined pattern representing emergency rescue signals, and information for the mobile communication terminal, and UWB-modulating the final bit stream.

2. The method as claimed in claim 1, wherein the control message includes a predetermined code indicating that the control message is a message for controlling the UWB signals and a predetermined code value for controlling an output value at which the UWB signals are outputted.

3. A method for transmitting an emergency rescue request using Ultra-Wideband (UWB) signals in a mobile communication terminal, the method comprising the steps of:
    calculating position information of the mobile communication terminal and generating UWB signals, when the mobile communication terminal is in an emergency rescue request mode for generating a UWB signal, wherein the UWB signals are obtained by generating a final bit stream that includes a bit stream, which has a predetermined pattern representing emergency rescue signals, and information for the mobile communication terminal, and UWB-modulating the generated final bit stream, and wherein the position information includes GPS position information obtained through GPS signals received from a GPS satellite;
    transmitting the calculated position information to a rescue center; and
    broadcasting the generated UWB signals.

4. The method as claimed in claim 3, wherein the emergency rescue request mode is executed when key input corresponding to an emergency rescue request is received from a user.

5. The method as claimed in claim 3, further comprising:
    periodically measuring Received Signal Strength Indication (RSSI) and determining whether the measured RSSI is smaller than a reference RSSI; and shifting to the emergency rescue request mode when the measured RSSI is smaller than the reference RSSI.

6. An emergency rescue request apparatus using Ultra-Wideband (UWB) signals, the apparatus comprising:
a received signal strength measurement unit for periodically measuring Received Signal Strength Indication (RSSI);
a baseband processor for generating a final bit stream including a bit stream, which has a predetermined pattern representing emergency rescue request signals, and information for the apparatus;
a UWB signal output unit for outputting the UWB signals obtained by UWB-modulating the final bit stream provided from the baseband processor; and
a controller for recognizing occurrence of an emergency according to an output value from the received signal strength measurement unit, providing the baseband processor with the bit stream, which has the predetermined pattern representing the emergency rescue request signals, and the information for the apparatus, and thus controlling the UWB signals to be transmitted from the apparatus.

7. The apparatus as claimed in claim 6, further comprises:
a key input unit including a key corresponding to an emergency rescue request, for outputting corresponding key input data when the key corresponding to the emergency rescue request is pressed by a user;
a display unit for displaying that the emergency rescue request signals are being outputted according to the emergency rescue request; and
a GPS receiver for receiving GPS signals representing position information for the apparatus.

8. An emergency rescue request apparatus using Ultra-Wideband (UWB) signals, the apparatus comprising:
a baseband processor for generating a final bit stream including a bit stream, which has a predetermined pattern representing emergency rescue request signals, and information for the apparatus;
a UWB signal output unit for outputting the UWB signals obtained by UWB-modulating the final bit stream provided from the baseband processor; and
a controller for receiving a control message including control contents for an emergency rescue mode, analyzing the received control message, generating the UWB signals according to the analysis result, and controlling the UWB signals to be transmitted from the apparatus.

9. The apparatus as claimed in claim 8, wherein the control message includes a predetermined code representing that the control message is a message for controlling the UWB signals to be transmitted from the apparatus and a predetermined code value for controlling an output value at which the UWB signals are outputted.

10. The apparatus as claimed in claim 9, wherein the controller determines the output value of the generated UWB signals according to the predetermined code value of the control message for controlling the output value at which the UWB signals are outputted, and controls the UWB signals to be transmitted from the apparatus.

11. An apparatus for receiving an emergency rescue request using Ultra-Wideband (UWB) signals, the apparatus comprising:
a UWB signal receiver having four antennas for receiving UWB signals from a predetermined terminal;
a UWB signal amplifier for amplifying signals inputted from the UWB signal receiver;
a cross-correlator for cross-correlating signals inputted from the UWB signal amplifier;
a peak detector for detecting a peak value through a value outputted from the cross-correlator and calculating a time difference;
a coordinate operation unit for calculating a position coordinate of the terminal by means of the time difference calculated through the peak detector; and
a coordinate display unit for displaying the calculated position coordinate.

12. The apparatus as claimed in claim 11, wherein the peak detector calculates a time difference of arrival for the cross-correlated signals inputted from the cross-correlator.

13. The apparatus as claimed in claim 11, wherein the coordinate operation unit calculates an orthogonal coordinate of the terminal from the time difference of arrival inputted from the peak detector by means of a Time Difference Of Arrival (TDOA) scheme.

14. The apparatus as claimed in claim 11, wherein the coordinate display unit displays direction and distance to a location of the terminal.

* * * * *